US012002965B2

United States Patent
Sawada

(10) Patent No.: US 12,002,965 B2
(45) Date of Patent: Jun. 4, 2024

(54) ALUMINUM FOIL

(71) Applicant: FUJIFILM Corporation, Tokyo (JP)

(72) Inventor: Hirokazu Sawada, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 17/675,160

(22) Filed: Feb. 18, 2022

(65) Prior Publication Data

US 2022/0173407 A1 Jun. 2, 2022

Related U.S. Application Data

(63) Continuation of application No. PCT/JP2020/029872, filed on Aug. 4, 2020.

(30) Foreign Application Priority Data

Aug. 22, 2019 (JP) .................................. 2019-151932

(51) Int. Cl.
*H01M 4/76* (2006.01)
*H01M 4/66* (2006.01)

(52) U.S. Cl.
CPC ........... *H01M 4/762* (2013.01); *H01M 4/661* (2013.01); *H01M 4/765* (2013.01); *Y10T 428/12479* (2015.01)

(58) Field of Classification Search
None
See application file for complete search history.

(56) References Cited

U.S. PATENT DOCUMENTS

2010/0035150 A1 2/2010 Ando et al.
2011/0236748 A1* 9/2011 Nakashima ....... H01M 10/6553
429/163

(Continued)

FOREIGN PATENT DOCUMENTS

CN 203787294 U 8/2014
JP 62-047963 A 3/1987

(Continued)

OTHER PUBLICATIONS

International Preliminary Report on Patentability dated Feb. 17, 2022 in International Application No. PCT/JP2020/029872.

(Continued)

*Primary Examiner* — Xiaobei Wang
(74) *Attorney, Agent, or Firm* — Sughrue Mion, PLLC

(57) ABSTRACT

Provided is a long aluminum foil capable of suppressing, in a case where the aluminum foil is provided with a region where through-holes are not formed, occurrence of deformation at a boundary portion between a region where through-holes are formed and the region where through-holes are not formed. The long aluminum foil includes, in a width direction orthogonal to a longitudinal direction, a perforated portion, a non-perforated portion, and a boundary portion between the perforated portion and the non-perforated portion, in which the perforated portion has a plurality of through-holes penetrating therethrough in a thickness direction, the non-perforated portion does not have a through-hole, the boundary portion has a plurality of through-holes penetrating therethrough in the thickness direction and a plurality of non-through-holes, and an opening ratio of the through-hole in the boundary portion gradually decreases from a perforated portion side to a non-perforated portion side.

17 Claims, 5 Drawing Sheets

(56) References Cited

U.S. PATENT DOCUMENTS

| | | | |
|---|---|---|---|
| 2013/0224544 A1 | 8/2013 | Kanemoto et al. | |
| 2018/0013148 A1* | 1/2018 | Matsuura | H01G 11/70 |
| 2021/0043942 A1 | 2/2021 | Takenaka et al. | |

FOREIGN PATENT DOCUMENTS

| | | | |
|---|---|---|---|
| JP | 2001-006688 A | 1/2001 | |
| JP | 2003-317723 A | 11/2003 | |
| JP | 2008-269890 A | 11/2008 | |
| JP | 2010-040370 A | 2/2010 | |
| JP | 2013-175370 A | 9/2013 | |
| WO | 2011/052122 A1 | 5/2011 | |
| WO | 2016/158245 A1 | 10/2016 | |
| WO | 2019/151063 A1 | 8/2019 | |
| WO | WO-2019151063 A1 * | 8/2019 | H01M 12/06 |

OTHER PUBLICATIONS

Written Opinion of the International Searching Authority dated Nov. 2, 2020 in International Application No. PCT/JP2020/029872.
International Search Report dated Nov. 2, 2020 in International Application No. PCT/JP2020/029872.

\* cited by examiner

ALUMINUM FOIL

CROSS-REFERENCE TO RELATED APPLICATIONS

This application is a Continuation of PCT International Application No. PCT/JP2020/029872 filed on Aug. 4, 2020, which claims priority under 35 U.S.C. § 119(a) to Japanese Patent Application No. 2019-151932 filed on Aug. 22, 2019. The above application is hereby expressly incorporated by reference, in its entirety, into the present application.

BACKGROUND OF THE INVENTION

1. Field of the Invention

The present invention relates to an aluminum foil.

2. Description of the Related Art

In recent years, in response to the development of portable devices such as personal computers and mobile phones, hybrid vehicles, electric vehicles, and the like, a demand for electric storage devices, particularly, lithium ion capacitors, lithium ion secondary batteries, and electric double layer capacitors as power supplies has been increased.

It is known that an aluminum plate is used as a collector for an electrode (hereinafter, simply referred to as a "collector") used for a positive electrode or a negative electrode of such an electric storage device. In addition, it is known that an active material, an activated carbon, or the like is applied to a surface of the collector formed of the aluminum plate as an electrode material, and is used as a positive electrode or a negative electrode.

In a large capacity next-generation secondary battery and a lithium ion capacitor, a large amount of lithium (Li) ions are doped into an electrode in advance according to the material of the electrode material in order to secure a sufficient capacity. As a method of doping Li ions, a method is well-known in which Li metal is put into a battery cell and dissolution in the battery cell is promoted, so that excess Li ions are spread to the electrode. The electrode material is originally a porous material that transmits Li ions. On the other hand, a collector serving as a support for an electrode material and serving as a conductive plate for taking in and out of electricity during charging and discharging is usually formed of a metal foil, and conducts electricity but does not conduct ions. Therefore, in order to spread Li ions to every corner of the electrode material in the battery cell, a perforated foil provided with a large number of through-holes for allowing Li ions to pass through the metal foil is used.

For example, WO2016/158245A discloses an aluminum plate having a plurality of through-holes in a thickness direction, in which a thickness thereof is 40 µm or less, an average opening diameter of the through-holes is 0.1 to 100 µm, an average opening ratio by the through-holes is 2% to 30%, a Fe content is 0.03% by mass or more, and a ratio of the Fe content to a Si content is 1.0 or more.

SUMMARY OF THE INVENTION

An aluminum foil used as a collector needs to be thinner from the viewpoints of size and weight reduction and energy density. On the other hand, in a case where a large number of through-holes are formed in the aluminum foil, the mechanical strength is lowered. Therefore, there is a problem that the aluminum foil is broken during manufacturing of the aluminum foil or in a case where an active material is applied to the aluminum foil.

With respect to this, WO2016/158245A discloses that a region having a small average opening ratio (0% to 5%) of the through-holes is provided at edge parts of two opposite sides of the aluminum foil to suppress the breakage and improve processability.

By the way, from the viewpoint of manufacturing efficiency and the like, it is conceivable to perform various steps such as formation of the through-holes or application of an active material while transporting a long aluminum foil in a longitudinal direction.

However, according to the study of the present inventor, it has been found that the following problem occurs.

In a case where various steps are carried out while continuously applying tension to a long aluminum foil, in a case where the aluminum foil that has a region having no through-hole at the edge part (or having small opening ratio) is manufactured while tension is continuously applied to the aluminum foil as described above, a region where the through-hole is formed (hereinafter, referred to as a perforated portion) has lower mechanical strength than a region where the through-hole is not formed (hereinafter, referred to as a non-perforated portion), and therefore, in the perforated portion, deformation, that is, elongation, in a direction in which the tension is applied is larger than that in the non-perforated portion. It has been found that a difference in elongation between the perforated portion and the non-perforated portion is remarkable especially at a boundary part between the perforated portion and the non-perforated portion, which causes a problem that a permanent strain such as lenticulation is formed at the boundary part.

Such a phenomenon occurs remarkably especially in a case where the aluminum foil having the through-hole is continuously wound, and appears as unevenness on the wound surface, thereby promoting deformation of the aluminum foil wound thereon.

An object of the present invention is to provide a long aluminum foil capable of suppressing, in a case where the aluminum foil is provided with a region where through-holes are not formed, occurrence of deformation at a boundary part between a region where through-holes are formed and the region where through-holes are not formed.

The present invention solves the problem by the following configuration.

[1] A long aluminum foil comprising: in a width direction orthogonal to a longitudinal direction, a perforated portion; a non-perforated portion; and a hole density decreasing portion between the perforated portion and the non-perforated portion, in which the perforated portion has a plurality of through-holes penetrating therethrough in a thickness direction, the non-perforated portion does not have a through-hole, the hole density decreasing portion has a plurality of through-holes penetrating therethrough in the thickness direction and a plurality of non-through-holes, and in the hole density decreasing portion, an opening ratio due to the through-holes gradually decreases from a perforated portion side to a non-perforated portion side.

[2] The aluminum foil according to [1], in which the perforated portion further has a plurality of non-through-holes.

[3] The aluminum foil according to [2], in which an area occupation ratio of the non-through-holes in the perforated portion is 1% or more and 20% or less.

[4] The aluminum foil according to any one of [1] to [3], in which a specific surface area $\Delta S_1$ on a surface of the perforated portion is 5% or more.

[5] The aluminum foil according to any one of [1] to [4], in which a specific surface area as on a surface of the hole density decreasing portion is 2.5% or more.

[6] The aluminum foil according to any one of [1] to [5], in which an area occupation ratio of the non-through-holes in the hole density decreasing portion is 1% or more and 15% or less.

[7] The aluminum foil according to any one of [1] to [6], in which in the width direction, a number density of the through-holes in the hole density decreasing portion gradually decreases from the perforated portion side to the non-perforated portion side, and an average number density of the through-holes in the hole density decreasing portion is 10% or more and 90% or less of an average number density of the through-holes in the perforated portion.

[8] The aluminum foil according to any one of [1] to [7], in which an average opening diameter of the through-holes in the hole density decreasing portion is 0.1 μm to 100 μm.

[9] The aluminum foil according to any one of [1] to [8], in which a width of the hole density decreasing portion in the width direction is 3 mm or more.

[10] The aluminum foil according to any one of [1] to [9], in which the non-perforated portions are provided at both ends in the width direction.

[11] The aluminum foil according to any one of [1] to [10], in which the hole density decreasing portions are provided at two or more locations in the width direction.

[12] The aluminum foil according to any one of [1] to [11], in which the long aluminum foil has a roll shape.

According to the present invention, it is possible to provide a long aluminum foil capable of suppressing, in a case where the aluminum foil is provided with a region where through-holes are not formed, occurrence of deformation at a boundary part between a region where through-holes are formed and the region where through-holes are not formed.

DESCRIPTION OF THE PREFERRED EMBODIMENTS

Hereinafter, the present invention will be described in detail.

The description of the configuration requirements described below may be made based on representative embodiments of the present invention, but the present invention is not limited to such embodiments.

In the present specification, a numerical range expressed by using "to" means a range including numerical values described before and after "to" as a lower limit and an upper limit.

Aluminum Foil

An aluminum foil of the embodiment of the present invention is a long aluminum foil comprising: in a width direction orthogonal to a longitudinal direction, a perforated portion; a non-perforated portion; and a hole density decreasing portion between the perforated portion and the non-perforated portion, in which the perforated portion has a plurality of through-holes penetrating therethrough in a thickness direction, the non-perforated portion does not have a through-hole, the hole density decreasing portion has a plurality of through-holes penetrating therethrough in the thickness direction and a plurality of non-through-holes, and in the hole density decreasing portion, an opening ratio due to the through-holes gradually decreases from a perforated portion side to a non-perforated portion side.

The configuration of the aluminum foil according to the embodiment of the present invention will be described with reference to FIGS. 1 to 4.

Figure 1:
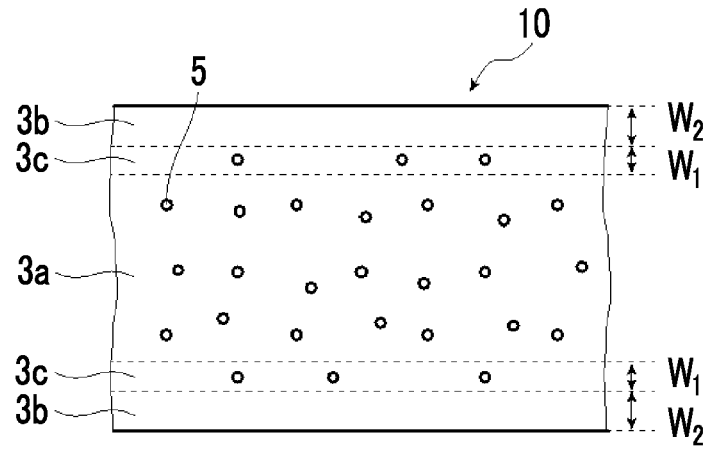
FIG. 1 is a plan view schematically showing an example of an aluminum foil of an embodiment of the present invention.
Figure 2:
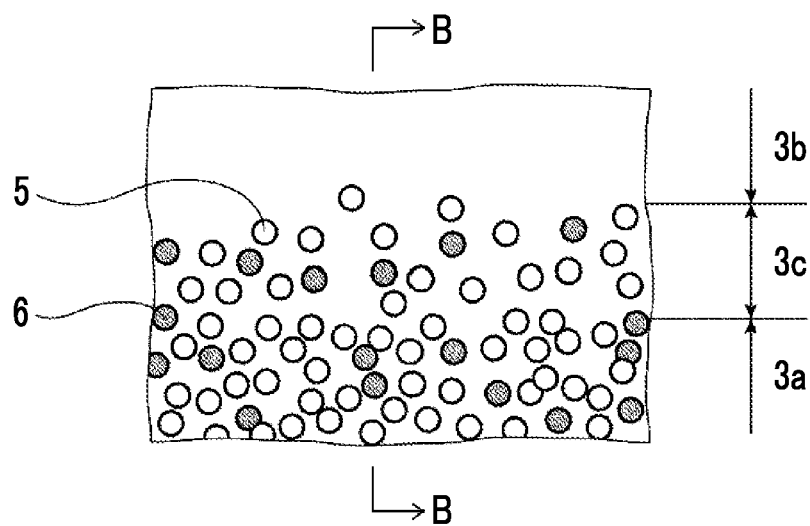
FIG. 2 is a partially enlarged view of the aluminum foil shown in FIG. 1.
Figure 3:
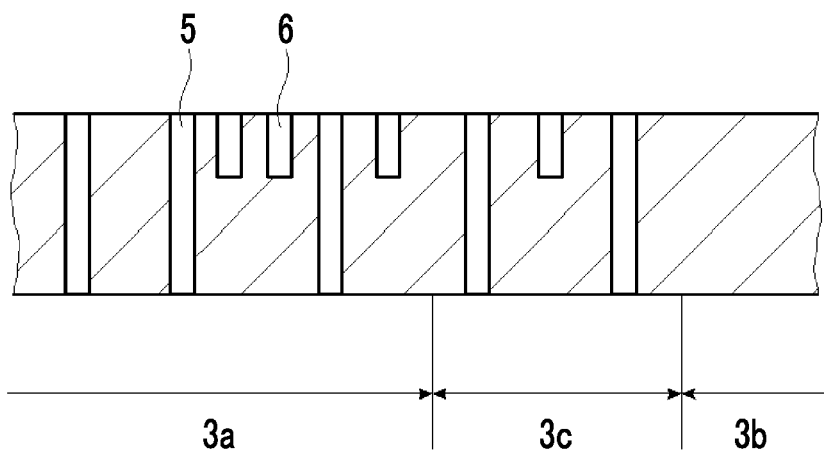
FIG. 3 is a cross-sectional view taken along line B-B of FIG. 2.
Figure 4:
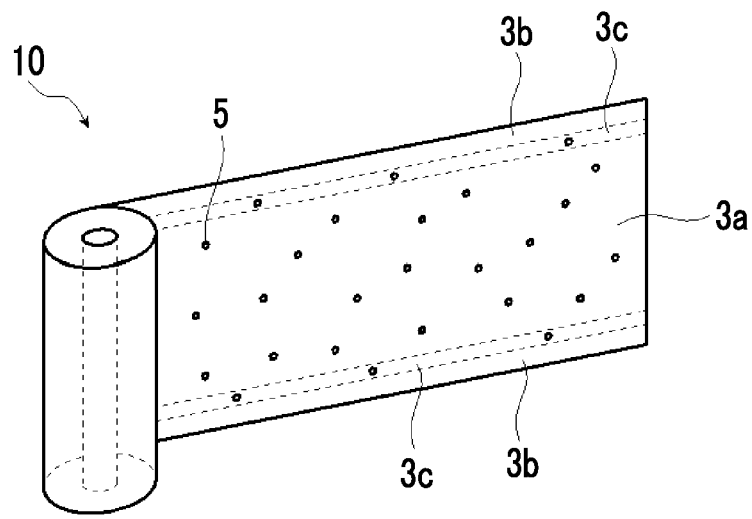
FIG. 4 is a perspective view schematically showing a state in which the aluminum foil of the embodiment of the present invention is wound in a roll shape.

FIG. 1 is a top view schematically showing an example of a preferred embodiment of the aluminum foil of the embodiment of the present invention. FIG. 2 is a partially enlarged view of the aluminum foil shown in FIG. 1. FIG. 3 is a cross-sectional view taken along the line B-B of the aluminum foil shown in FIG. 2. FIG. 4 is a perspective view schematically showing a state in which the aluminum foil of the embodiment of the present invention is wound in a roll shape.

As shown in FIG. 1, an aluminum foil 10 is made of a long aluminum substrate 3, and the aluminum substrate 3 is provided with a plurality of through-holes 5 penetrating in a thickness direction. In a width direction orthogonal to the longitudinal direction of the aluminum foil 10, the aluminum foil 10 has a perforated portion 3a provided in a central portion, non-perforated portions 3b respectively provided at both end portions, and a hole density decreasing portion 3c between the perforated portion 3a and the non-perforated portion 3b. That is, in the example shown in FIG. 1, the aluminum foil 10 has, from one end portion toward the other end portion in the width direction, the non-perforated portion 3b, the hole density decreasing portion 3c, the perforated portion 3a, the hole density decreasing portion 3c, and the non-perforated portion 3c in this order.

In FIG. 1, a left-right direction in the drawing is the longitudinal direction of the aluminum foil 10, and a vertical direction in the drawing is the width direction. This point is the same in FIGS. 2 and 5. In addition, in FIG. 1, the non-through-hole is not shown.

As shown in FIG. 4, the long aluminum foil 10 may be wound in a roll shape. For example, the long aluminum foil 10 is provided in various steps in a form of a roll, and the aluminum foil 10 is pulled out from the roll to perform various steps.

As shown in FIGS. 2 and 3, the perforated portion 3a is a region in which the plurality of through-holes 5 penetrating in the thickness direction are formed. As a preferred embodiment, a plurality of non-through-holes 6 (recess portions) that do not penetrate in the thickness direction are also formed in the perforated portion 3a.

In FIG. 2, the through-hole 5 is indicated by a white circle, and the non-through-hole 6 is indicated by a filled circle.

The non-perforated portion 3b is a region in which the through-hole is not formed, in addition, it is preferable that the non-through-hole is not formed in the non-perforated portion 3b.

The hole density decreasing portion 3c is a region in which the plurality of through-holes 5 penetrating in the thickness direction and the non-through-holes 6 not penetrating in the thickness direction are formed.

Here, in the hole density decreasing portion 3c, an opening ratio due to the through-holes 5 (hereinafter, also simply referred to as an opening ratio) gradually decreases from the perforated portion 3a side toward the non-perforated portion 3b side. That is, in the hole density decreasing portion 3c, an opening ratio in a region near the perforated portion 3a is larger than an opening ratio in a region near the non-perforated portion 3b, and the closer the region to the perforated portion 3a side, the larger the opening ratio.

As described above, since the aluminum foil used as a collector is thin and has the through-hole, mechanical strength thereof is low, and there is a problem that breakage occurs in a case where various steps are carried out.

With respect to this, it is proposed to suppress breakage and improve processability by providing a region having no through-hole at an edge part of the aluminum foil.

However, according to the study of the present inventor, it has been found that the following problem occurs.

In a case where an aluminum foil is used in a long form and various steps are carried out while continuously applying tension to the long aluminum foil, in a case where the aluminum foil that has a region having no through-hole at an edge part is manufactured while tension is continuously applied to the aluminum foil, a region where a through-hole is formed (perforated portion) has lower mechanical strength than a region where the through-hole is not formed (non-perforated portion), and therefore, in the perforated portion, deformation, that is, elongation, in a direction in which the tension is applied is larger than that the non-perforated portion. It has been found that a difference in elongation between the perforated portion and the non-perforated portion is remarkable especially at a boundary part between the perforated portion and the non-perforated portion, which causes a problem that deformation due to a permanent strain such as lenticulation is formed at the boundary part.

Such a phenomenon occurs remarkably especially in a case where the aluminum foil having the through-hole is continuously wound, and appears as unevenness on the wound surface, thereby promoting deformation of the aluminum foil wound thereon.

With respect to this, the aluminum foil of the embodiment of the present invention has, between the perforated portion and the non-perforated portion, a hole density decreasing portion that has a through-hole and a non-through-hole and in which an opening ratio due to the through-holes gradually decreases from the perforated portion side to the non-perforated portion side. Since the opening ratio of the hole density decreasing portion gradually decreases from the perforated portion side to the non-perforated portion side, it is easy to elongate in the vicinity of the perforated portion and difficult to elongate in the vicinity of the non-perforated portion, and the easiness of deformation (easiness of elongation) gradually changes therebetween. As a result, the region near the perforated portion in the hole density decreasing portion has an elongation amount close to an elongation amount of the perforated portion, and the region near the non-perforated portion has an elongation amount close to an elongation amount of the non-perforated portion, and the elongation amount gradually decreases from the perforated portion side to the non-perforated portion side in the region therebetween. By providing such a hole density decreasing portion between the perforated portion and the non-perforated portion, stress concentration at the boundary part between the perforated portion and the non-perforated portion can be suppressed, and occurrence of deformation caused by a difference in elongation between the perforated portion and the non-perforated portion can be suppressed.

In addition, since the hole density decreasing portion has the non-through-hole, stress distribution in a case where tension is applied to the aluminum foil can be made non-uniform. By making the stress distribution non-uniform, it is possible to make it difficult to concentrate the stress at a specific location, whereby it is possible to reduce accumulation of a permanent strain caused by the difference in elongation between the perforated portion and the non-perforated portion at a specific location and to suppress occurrence of deformation.

The perforated portion, the hole density decreasing portion, and the non-perforated portion are determined as follows.

The non-perforated portion is defined as a part where no through-hole exists in a square of 3 mm×3 mm in a case where the presence or absence of the through-hole is confirmed by the following method while a region of 3 mm×3 mm is shifted by 1 mm in the width direction of the aluminum foil. In the confirmation method, in a case where a sample is placed on a surface light emitting plate such as Schaukasten, and transmitted light from the hole is not visible in the region, it is determined as a non-perforated portion.

Therefore, the regions other than the non-perforated portion are determined to be the perforated portion and the hole density decreasing portion.

The boundary between the perforated portion and the hole density decreasing portion is determined as follows.

First, the aluminum foil is placed on a surface light emitting plate such as Schaukasten, and a part where the transmitted light is visually reduced is defined as a temporary hole density decreasing portion. In the width direction, a region on the perforated portion side of 10 mm or more from the boundary between the temporary hole density decreasing portion and the perforated portion is defined as the perforated portion, and an average opening ratio in the perforated portion is obtained.

The average opening ratio of the through-hole in the perforated portion is measured as follows.

By taking a picture from the surface side of the aluminum foil with a bottom light source of parallel light using an optical microscope, each through-hole is captured with transmitted light. By imaging at a magnification of 100 and binarizing an image in a range of 1 mm×0.7 mm by image analysis software, the opening ratio (opening area/geometric area) is obtained from a ratio of the total opening area of the through-holes to an area of a visual field (geometric area). Similarly, an average opening diameter is obtained by averaging an equivalent circle diameter of each opening portion, and the number of each opening portion is obtained to obtain a hole density per unit area (1 mm$^2$). This operation is usually performed at N=5 locations by changing the observation position, and an average of the opening ratio, the average opening diameter, and the hole density of the corresponding part is obtained.

Next, a method of determining the boundary between the perforated portion and the hole density decreasing portion and obtaining the opening ratio of the hole density decreasing portion will be described. For observation, in the same way as the measurement of the opening ratio of the perforated portion, each through-hole is captured with transmitted light by taking a picture from the surface side of the aluminum foil with a bottom light source of parallel light using an optical microscope. By imaging at a magnification of 100 and binarizing an image in a range of 1 mm×0.7 mm by image analysis software, the opening ratio (opening area/geometric area) is obtained from a ratio of the total opening area of the through-holes to an area of a visual field (geometric area). Similarly, an average opening diameter is obtained by averaging an equivalent circle diameter of each opening portion, and the number of each opening portion is obtained to obtain a hole density per unit area (1 mm$^2$).

A visual field of 1 mm (width direction)×0.7 mm (length direction) is observed at a magnification of 100 by changing the position in the width direction in a unit of 1 mm centering on the temporary boundary between the perforated portion and the hole density decreasing portion. Here, in a case where a value of the opening ratio of the perforated portion is X and a region having the opening ratio of 0.7 X or less continues in two or more consecutive locations, a region where an opening ratio is initially 0.7 times or less of the opening ratio of the perforated portion is determined as the boundary between the perforated portion and the hole density decreasing portion.

Next, the opening ratio of the hole density decreasing portion is defined as an average value of a region between the region close to the non-perforated portion and the non-perforated portion, adjacent to the region including the boundary described above. For example, in a case where the average opening ratio of the perforated portion is 5% and a region where an opening ratio initially decreases to 3.5% is defined as the boundary portion, in a case where five hole density decreasing portions exist as a region of 1 mm×0.7 mm between a region adjacent to the boundary portion and the non-perforated portion, an average value of the opening ratios of the five regions is defined as the opening ratio of the hole density decreasing portion. The hole density and the average opening diameter are calculated in the same manner.

As described above, the perforated portion, the hole density decreasing portion, and the non-perforated portion are determined.

Here in the perforated portion, the average opening ratio of the through-hole is preferably 0.15% to 30%, more preferably 0.5% to 30%, still more preferably 1% to 20%, and particularly preferably 2% to 10%.

By setting the average opening ratio of the through-hole the above range, it is possible to prevent occurrence of leakage or the like in a case of applying the active material to the aluminum foil and to improve adhesiveness with the applied active material. In addition, even in a case where the aluminum foil has a large number of through-holes, the aluminum foil can have sufficient tensile strength.

In the perforated portion, the average opening diameter of the through-holes is preferably 0.1 μm or more and 100 μm or less, more preferably more than 1 μm and 80 μm or less, still more preferably more than 3 μm and 40 μm or less, and particularly preferably 5 μm or more and 30 μm or less.

By setting the average opening diameter of the through-holes in the perforated portion within the above range, it is possible to prevent occurrence of leakage or the like in a case of applying the active material or the like to the aluminum foil and to improve adhesiveness with the applied active material. In addition, even in a case where the aluminum foil has a large number of through-holes, the aluminum foil can have sufficient tensile strength.

Similarly, in the hole density decreasing portion, the average opening diameter of the through-holes is preferably 0.1 μm or more and 100 μm or less, more preferably more than 1 μm and 80 μm or less, still more preferably more than 3 μm and 40 μm or less, and particularly preferably 5 μm or more and 30 μm or less.

In a case where the active material is applied, the non-perforated portion is generally uncoated in order to attach a terminal tab to the collector, and in this case, the hole density decreasing portion becomes a boundary between the coated portion and the uncoated portion in many cases. Therefore, in order to prevent a material such as the active material from passing through the hole and leaking to the back surface in a case of application in the hole density decreasing portion, it is preferable to set the average opening diameter of the through-holes in the hole density decreasing portion within the above range.

From the viewpoint that deformation can be suitably suppressed, the width of the hole density decreasing portion in the width direction is preferably 3 mm or more, more preferably 5 mm or more, and still more preferably 7 mm or more.

The gradual decrease tendency of the opening ratio in the hole density decreasing portion may be constant in the longitudinal direction, but is preferably changed in the longitudinal direction. Since a configuration in which the gradual decrease tendency of the opening ratio in the hole density decreasing portion changes in the longitudinal direction is adopted, in a case of winding a long aluminum foil, a possibility that a minute difference in elongation in the width direction due to tension is accumulated and strain is generated can be reduced.

As a method of changing the gradual decrease tendency of the opening ratio in the hole density decreasing portion, it is preferable to change the width of the hole density decreasing portion. Specifically, in a case where the width of the hole density decreasing portion is measured at five or more positions at intervals of 50 mm in the longitudinal direction, a difference between the maximum value and the minimum value of the width of the hole density decreasing portion is preferably 1 mm or more, more preferably 2 mm or more and 6 mm or less, and still more preferably 2 mm or more and 4 mm or less.

In a case where the width of the hole density decreasing portion changes, a configuration in which the boundary between the hole density decreasing portion and the perforated portion is constant and the boundary between the hole density decreasing portion and the non-perforated portion changes may be adopted, a configuration in which the boundary between the hole density decreasing portion and the perforated portion changes and the boundary between the hole density decreasing portion and the non-perforated portion is constant may be adopted, or a configuration in which the boundary between the hole density decreasing portion and the perforated portion changes and the boundary between the hole density decreasing portion and the non-perforated portion changes may be adopted.

In the example shown in FIG. 2, a configuration in which the perforated portion has non-through-holes is adopted, but a configuration in which the perforated portion does not have non-through-holes may be adopted.

Since the perforated portion has non-through-holes, a surface area is increased, and an area closely attached to an active material layer is increased, whereby adhesiveness is further improved.

From the viewpoint of adhesiveness with the active material, the average opening diameter of the non-through-holes in the perforated portion is preferably 0.1 µm to 100 µm, more preferably 1 µm to 50 µm, and still more preferably 2 µm to 30 µm.

The average opening diameter of the non-through-holes is obtained by capturing an image of the surface of the aluminum foil using a high resolution scanning electron microscope (SEM) at a magnification of 200 from one surface of the aluminum foil from directly above, extracting at least 20 recess portions (pits) of an uneven structure having a circumference that continues in a ring shape in the obtained SEM image, scanning the maximum diameter thereof to obtain the opening diameter, and calculating the average value thereof as the average opening diameter. The maximum diameter is the maximum value of the linear distance in one edge part constituting the opening portion of the non-through-hole. For example, in a case where the non-through-hole is circular, it means the diameter; in a case where the non-through-hole is elliptical, it means the major axis; and in a case where the non-through-hole is formed by overlapping a plurality of circles, it means the maximum value of the linear distance between the edge part of one circle and the edge part of the other circle.

From the viewpoint of adhesiveness with the active material, the area occupation ratio of the non-through-holes in the perforated portion is preferably to 20%, more preferably 2% to 15%, and still more preferably to 10%.

The area occupation ratio of the non-through-holes is obtained by capturing an image of the surface of the aluminum foil from directly above at a magnification of 200 by using a high resolution scanning electron microscope (SEM), observing the concave part and the non-concave part by binarizing the visual field (five locations) of 30 mm×30 mm in the obtained SEM image by image analysis software, calculating the ratio (opening area/geometric area) of the total opening area of the recess portions to the area of the visual field (geometric area), and calculating the average value in each visual field (five locations) as the area occupation ratio.

From the viewpoint that deformation caused by the difference in elongation between the perforated portion and the non-perforated portion can be suitably suppressed, the average opening diameter of the non-through-holes in the hole density decreasing portion is preferably 0.1 µm to 100 µm, more preferably 1 µm to 50 µm, and still more preferably 2 µm to 30 µm.

From the viewpoint that deformation can be suitably suppressed, the area occupation ratio of the non-through-holes in the hole density decreasing portion is preferably 1% to 15%, more preferably 2% to 15%, and still more preferably 5% to 10%.

From the viewpoint of adhesiveness with the active material, the specific surface area $\Delta S_1$ in the perforated portion is preferably 5% or more, more preferably 6% or more and 40% less, and still more preferably 7% or more and 30% or less.

Here, the specific surface area S is obtained from an actual area $S_x$ obtained by the approximate three-point method from three-dimensional data obtained by measuring a range of 25 µm×25 µm on the surface of the aluminum foil at 512×512 points using an atomic force microscope and a geometrically measured area $S_0$ by the following equation (i).

$$\Delta S=(S_x-S_0)/S_0\times 100 \ (\%) \quad (i)$$

Specifically, in order to obtain the specific surface area $\Delta S$, the surface shape is measured by an atomic force microscope (AFM) to obtain the three-dimensional data. The measurement can be performed under the following conditions, for example.

That is, a 1 cm square sample is cut out from the aluminum foil and set on a horizontal sample table on a piezo scanner, and a cantilever is made to approach the surface of the sample. In a case where the cantilever reaches a region where the atomic force acts, the surface of the sample is scanned in the XY direction, and in this case, the surface shape (wave structure) of the sample is read based on the piezoelectric displacement in the Z direction. As the piezo scanner, a piezo scanner capable of scanning the XY direction of 150 µm and the Z direction 10 µm is used. As the cantilever, a cantilever having a resonance frequency of 120 to 150 kHz and a spring constant of 12 to 20 N/m (SI-DF20, manufactured by Nanoprobes, Inc.) is used, and measurement is performed in the (dynamic force mode) DFM mode. In addition, the obtained three-dimensional data is approximated by the least-squares method to correct a slight inclination of the sample and obtain a reference plane. In the measurement, a range of 25 µm×25 µm on the surface is measured at 512×512 points. The resolution in the XY direction is 0.1 µm, the resolution in the Z direction is 1 nm, and the scan speed is 60 µm/sec.

Using the three-dimensional data (f(x,y)) obtained above, adjacent three points are extracted and the areas of minute triangles formed by the three points are summated, thereby giving the actual area $S_x$. The specific surface area $\Delta S$ is obtained from the obtained actual area $S_x$ and the geometrically measured area (projected area) $S_0$ using the above equation (i).

In a case of measuring the three-dimensional data, the measurement is performed in such a manner that the through-hole is not included in a range of 25 μm×25 μm.

From the viewpoint that deformation can be suitably suppressed, the specific surface area $\Delta S_2$ in the hole density decreasing portion is preferably 2.5% or more, more preferably 3% or more and 20% or less, and still more preferably 4% or more and 15% or less.

Here, in the hole density decreasing portion, the configuration in which the opening ratio of the through-hole gradually decreases toward the non-perforated portion in the width direction may be a configuration in which the opening ratio gradually decreases as the opening diameter of the through-hole decreases toward the non-perforated portion in the width direction, a configuration in which the opening ratio gradual decreases as the number density of the through-holes decreases toward the non-perforated portion in the width direction, or a configuration in which the opening ratio gradually decreases by a combination of the opening diameter and the number density of the through-holes.

It is preferable that the number density of the through-holes in the hole density decreasing portion gradually decreases from the perforated portion side to the non-perforated portion side in the width direction.

In addition, the average number density of the through-holes in the hole density decreasing portion is preferably 10% or more and 90% or less, more preferably 20% or more and 80% or less, and still more preferably 25% or more and 70% or less of the average number density of the through-holes in the perforated portion.

Here, in the example shown in FIG. 1, a configuration in which the non-perforated portions are provided at two locations in the width direction of the aluminum foil is adopted, but the present invention is not limited to this, and a configuration in which the non-perforated portion is provided at one location in the width direction of the aluminum foil may be adopted, or a configuration in which the non-perforated portions are provided at three or more locations may be adopted.

In addition, in the example shown in FIG. 1, a configuration in which the non-perforated portions are provided at both end portions in the width direction of the aluminum foil is adopted, but the present invention is not limited to this, and a configuration in which the non-perforated portions are provided at parts other than the end portions may be adopted.

Figure 5:
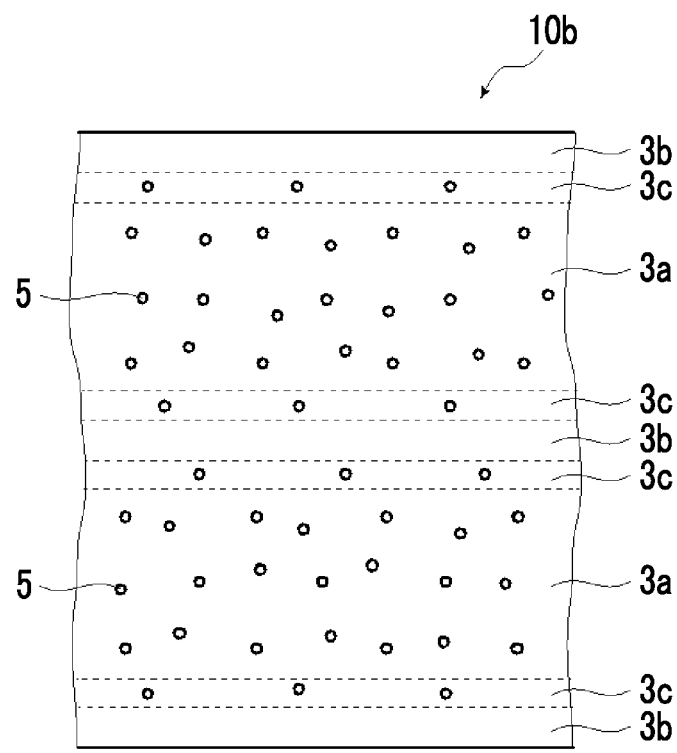
FIG. 5 is a plan view schematically showing another example of the aluminum foil of the embodiment of the present invention.
Figure 6:
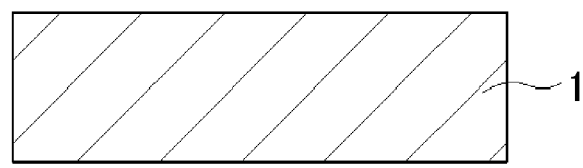
FIG. 6 is a schematic cross-sectional view for describing an example of a suitable manufacturing method of the aluminum foil of the embodiment of the present invention.
Figure 7:
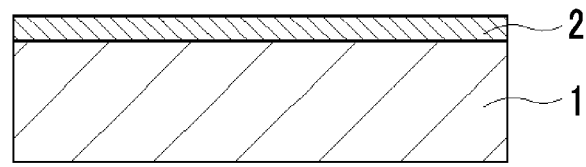
FIG. 7 is a schematic cross-sectional view for describing the example of the suitable manufacturing method of the aluminum foil of the embodiment of the present invention.
Figure 8:
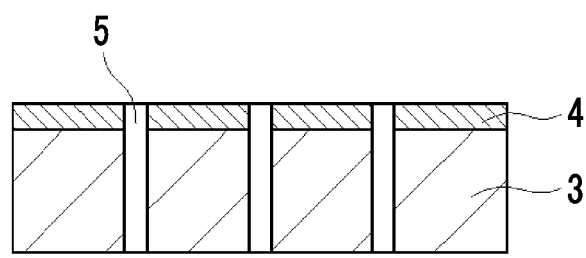
FIG. 8 is a schematic cross-sectional view for describing the example of the suitable manufacturing method of the aluminum foil of the embodiment of the present invention.
Figure 9:
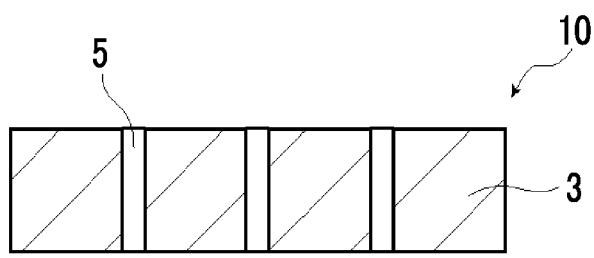
FIG. 9 is a schematic cross-sectional view for describing the example of the suitable manufacturing method of the aluminum foil of the embodiment of the present invention.
Figure 10:
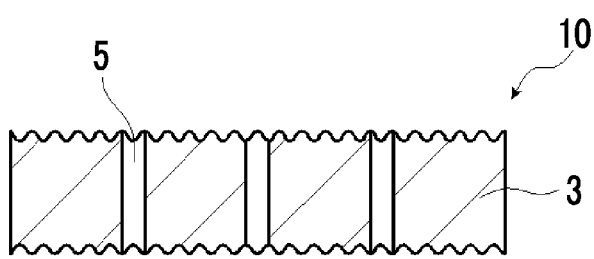
FIG. 10 is a schematic cross-sectional view for describing the example of the suitable manufacturing method of the aluminum foil of the embodiment of the present invention.
Figure 11:
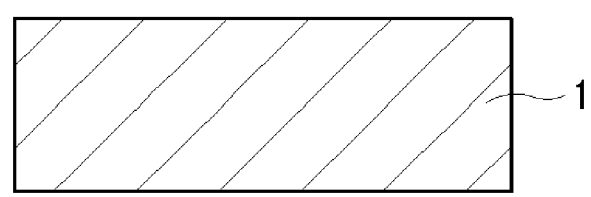
FIG. 11 is a schematic cross-sectional view for describing another example of the suitable manufacturing method of the aluminum foil of the embodiment of the present invention.
Figure 12:
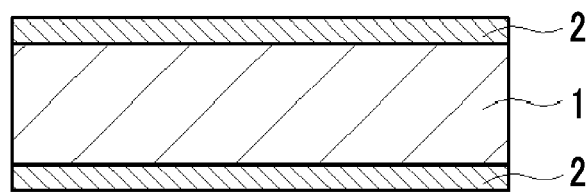
FIG. 12 is a schematic cross-sectional view for describing the other example of the suitable manufacturing method of the aluminum foil of the embodiment of the present invention.
Figure 13:
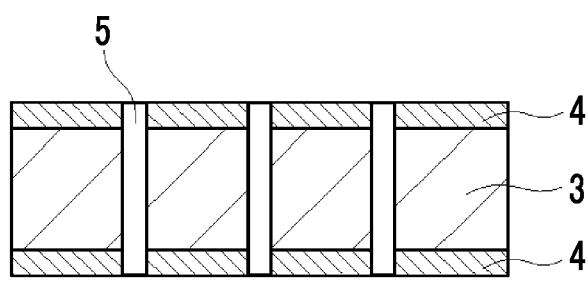
FIG. 13 is a schematic cross-sectional view for describing the other example of the suitable manufacturing method of the aluminum foil of the embodiment of the present invention.
Figure 14:
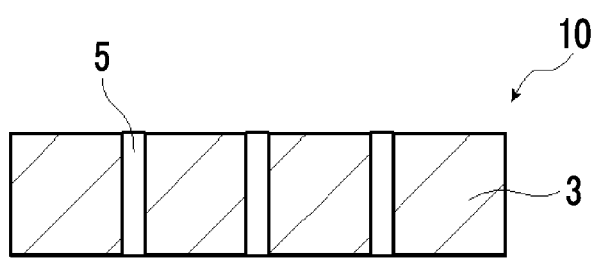
FIG. 14 is a schematic cross-sectional view for describing the other example of the suitable manufacturing method of the aluminum foil of the embodiment of the present invention.
Figure 15:
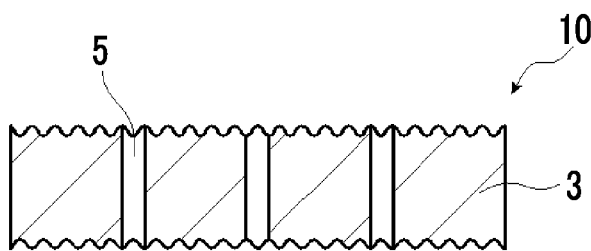
FIG. 15 is a schematic cross-sectional view for describing the other example of the suitable manufacturing method of the aluminum foil of the embodiment of the present invention.

For example, an aluminum foil 10b shown in FIG. 5 has the non-perforated portions 3b at both end portions and a central portion in the width direction. That is, the aluminum foil 10b has a configuration in which the non-perforated portions 3b are provided at three locations in the width direction. Therefore, the perforated portions 3a are provided at two places in total in regions sandwiched between the two non-perforated portions 3b. In addition, the hole density decreasing portions 3c are provided at four locations in total in regions between the perforated portion 3a and the non-perforated portion 3b.

That is, in the width direction (vertical direction in the drawing), the aluminum foil 10b has, from one end portion toward the other end portion, the non-perforated portion 3b, the hole density decreasing portion 3c, the perforated portion 3a, the hole density decreasing portion 3c, the non-perforated portion 3b, the hole density decreasing portion 3c, the perforated portion 3a, the hole density decreasing portion 3c, and the non-perforated portion 3b in this order.

In a case of a configuration having the non-perforated portions 3b at both end portions and the central portion in the width direction as in the aluminum foil 10b shown in FIG. 5, by cutting the aluminum foil 10b at the position of the non-perforated portion 3b in the central portion, two aluminum foils 10 as shown in FIG. 1 can be produced.

Aluminum Substrate

The aluminum substrate to be a base material of the aluminum foil is not particularly limited, and for example, a well-known aluminum substrate such as alloy number 1085, 1N30, 3003, 8021, or 1100 described in JIS standard H4000 can be used. The aluminum substrate is an alloy plate containing aluminum as a main component and containing a trace amount of foreign elements.

The thickness of the aluminum substrate (aluminum foil) is not particularly limited, but is preferably 5 μm to 100 μm and more preferably 10 μm to 30 μm.

Here, the average thickness of the aluminum substrate refers to an average value of thicknesses measured at any five points using a contact-type film thickness measuring meter (digital electronic micrometer).

Manufacturing Method of Aluminum Foil

Next, an example of a manufacturing method for producing the aluminum foil according to the embodiment of the present invention will be described. The manufacturing method for producing the aluminum foil of the embodiment of the present invention is not limited to this.

The manufacturing method for producing the aluminum foil includes, for example, a film forming step of forming a film containing aluminum hydroxide as a main component on a surface of the aluminum substrate, a through-hole forming step of forming a through-hole by performing a through-hole forming treatment after the film forming step, and a film removing step of removing the aluminum hydroxide film after the through-hole forming step.

Next, each step of the manufacturing method of the aluminum tail will be described with reference to FIGS. 6 to 10 and FIGS. 11 to 15, and then the details of each step will be described.

FIGS. 6 to 10 and FIGS. 11 to 15 are schematic cross-sectional views for describing the manufacturing method of the aluminum foil.

As shown in FIGS. 6 to 10 and FIGS. 11 to 15, the manufacturing method of the aluminum is a production method including a film forming step of performing a film forming treatment on one main surface (both main surfaces in the aspect shown in FIG. 11) of an aluminum substrate 1 to form an aluminum hydroxide film 2 (FIGS. 6 and 7 and FIGS. 11 and 12), a through-hole forming step of forming through-holes 5 by performing an electrolytic dissolution treatment after the film forming step, thereby producing an aluminum foil having an aluminum substrate 3 having the through-holes and an aluminum hydroxide film 4 having the through-holes (FIGS. 7 and 8 and FIGS. 12 and 13), and a film removing step of removing the aluminum hydroxide film 4 having the through-holes after the through-hole forming step to produce an aluminum foil 10 formed of the aluminum substrate 3 having the through holes (FIGS. 8 and 9 and FIGS. 13 and 14).

Figure 16:
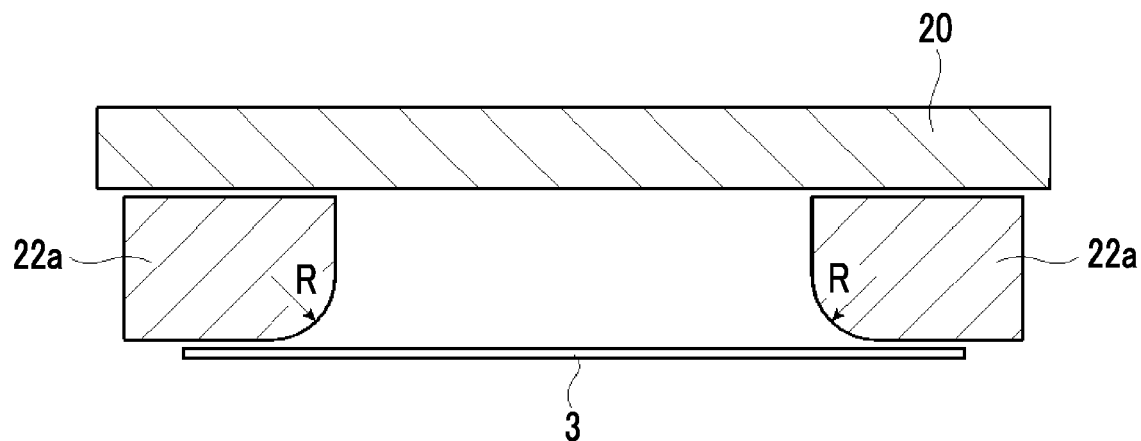
FIG. 16 is a diagram for describing an example of arrangement of an electrode and a current shielding plate in a through-hole forming step.
Figure 17:
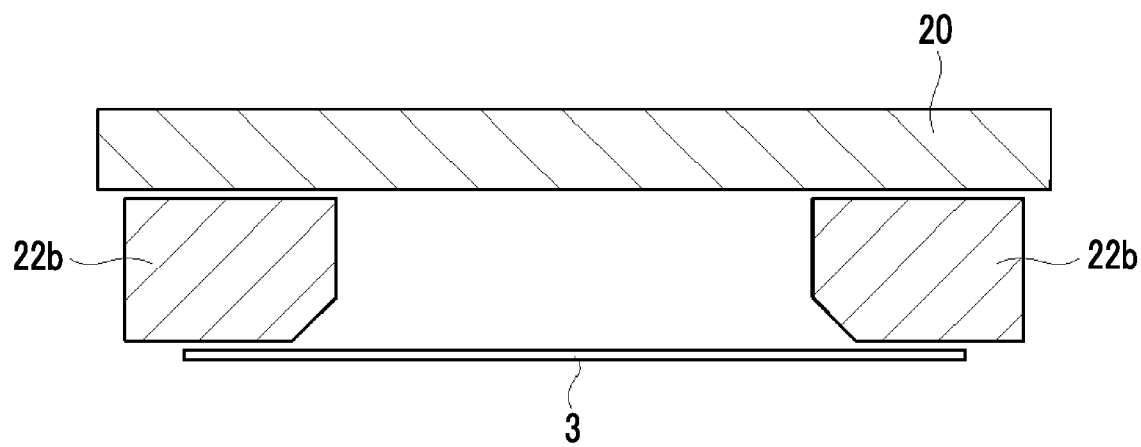
FIG. 17 is a diagram for describing another example of arrangement of the electrode and the current shielding plate in the through-hole forming step.

Here, in order to harm a configuration having a non-perforated portion and a hole density decreasing portion as in the aluminum foil of the embodiment of the present invention, in the through-hole forming step, as shown in FIG. 16, a current shielding plate 22a is disposed between an electrode 20 and the aluminum substrate 3 in a case where the electrolytic dissolution treatment is performed. In FIG. 16 and FIG. 17 described below, the left-right direction in the drawing is the width direction of the aluminum foil.

As will be described below, an electrolytic dissolution treatment is performed to form the through-hole in the through-hole forming step. In this case, the electrode 20 is disposed to face the aluminum substrate 3, and a voltage is applied thereto by using the electrode 20 and the aluminum substrate 3 as an electrode pair, so that a current flows through an electrolytic solution, and dissolution is selectively started from a part where an electric resistance of the film on the surface is low, and the through-hole is formed. A current flows between the aluminum substrate 3 and the electrode 20 through an electrolytic solution and electrochemical dissolution reaction proceeds, thereby forming the through-hole. Therefore, in a case where the current shielding plate 22a the shielding the current is disposed at an optional position between the aluminum substrate 3 and the electrode 20, the current does not flow and the dissolution reaction does not proceed, and thus the non-perforated portion can be formed at a position where the current shielding plate 22a is disposed.

Therefore, as shown in FIG. 16, by disposing the current shielding plates 22a at both end portions in the width direction, it is possible to form the nonperforated portions at both end portions of the aluminum foil.

Further, in order to form the hole density decreasing portion, as shown in FIG. 16, the current shielding plate 22a has a shape in which the thickness gradually decreases at the end portion on the center side in the width direction. In the example shown in FIG. 16, the corner portion on the aluminum foil side of the end portion on the center side has an R shape.

With such a configuration, a gap between the current shielding plate 22a and the aluminum substrate 3 gradually increases to the center side in the width direction. As a result, in a case where a voltage is applied between the electrode 20 and the aluminum substrate 3, a density of electric lines of force in this region gradually decreases from the center side to the end portion side. Therefore, it becomes difficult for the through-hole to be formed on the end portion side, and the hole density decreasing portion can be formed in which the opening ratio due to the through-holes gradually decreases from the perforated portion side to the non-perforated portion side.

In the example shown in FIG. 16, the current shielding plate 22a has a configuration in which the corner portion on the aluminum foil side of the end portion on the center side has an R shape, but the present invention is not limited to this. For example, as in a current shielding plate 22b shown in FIG. 17, a configuration in which the corner portion on the aluminum foil side or the end portion on the center side is C-chamfered may be adopted.

In the above example, a configuration in which the current shielding plate is disposed between the aluminum substrate and the electrode to form the hole density decreasing portion and the non-perforated portion is adopted, but the present invention is not limited to this, and there is no limitation to the method in a case where the hole density decreasing portion and the non-perforated portion can be formed.

For example, a method is conceivable in which the electrode is divided in the width direction and currents flowing through the electrodes are controlled so that the current values are distributed in the width direction.

The manufacturing method of the aluminum foil may include a roughening treatment step of performing an electrochemical roughening treatment on the aluminum substrate 3 having the through-hole after the film removing step to produce the aluminum foil 10 having a roughened surface (FIGS. 11 and 12 and FIGS. 16 and 17).

Further, it is preferable to provide a water-washing step of performing a water-washing treatment after the completion of each of the film forming step, the through-hole forming step, and the film removing step.

In addition, it is preferable to provide a drying step of performing a drying treatment after the water-washing treatment after each step.

Film Forming Step

The film forming step is a step of performing a film forming treatment on the surface of the aluminum substrate to form an aluminum hydroxide film.

Film Forming Treatment

The above film forming treatment is not particularly limited, and for example, it is possible to perform the same treatment as a well-known aluminum hydroxide film forming treatment of the related art.

As the film forming treatment, it is possible to appropriately employ, for example, conditions or devices disclosed in paragraphs [0013] to [0026] of JP2011-201123A.

In the present invention, the conditions of the film forming treatment vary in diverse manners depending on electrolytic solutions being used and thus cannot be determined uniformly, but generally it is suitable to have the concentration of an electrolytic solution of 1% to 80% by mass, the liquid temperature of 5° C. to 70° C., the current density of 0.5 to 60 A/dm$^2$, the voltage of 1 to 100 V, and the electrolysis duration of 1 second to 20 minutes, and the conditions are adjusted to obtain a desired amount of film.

In the present invention, an electrochemical treatment is preferably carried out using nitric acid, hydrochloric acid, sulfuric acid phosphoric acid, oxalic acid, or a mixed acid of two or more of these acids as an electrolytic solution.

In a case where the electrochemical treatment is carried out in an electrolytic solution containing nitric acid and hydrochloric acid, a direct current may be applied between the aluminum substrate and the counter electrode, or an alternating current may be applied therebetween. In a case where a direct current is applied to the aluminum substrate, the current density is preferably 1 to 60 A/dm$^2$, and more preferably 5 to 50 A/dm$^2$. In a case where the electrochemical treatment is continuously carried out, it is preferable to carry out the electrochemical treatment by a liquid power feeding method in which power is fed to the aluminum substrate through an electrolytic solution.

In the present invention, the amount of the aluminum hydroxide film being formed by the film forming treatment is preferably 0.05 to 50 A/dm$^2$ and more preferably 0.1 to 10 g/m$^2$.

Through-Hole Forming Step

The through hole forming step is a step of forming a through-hole by performing an electrolytic dissolution treatment after the film forming step.

Electrolytic Dissolution Treatment

The above electrolytic dissolution treatment is not particularly limited, and a direct current or an alternating current can be used, and an acidic solution can be used as an electrolytic solution. In particular, it is preferable to perform the electrochemical treatment using at least one acid of nitric acid or hydrochloric acid, and more preferable to perform the electrochemical treatment using a mixed acid of at least one of sulfuric acid, phosphoric acid, or oxalic acid in addition to the above-described acids.

In the present invention, as an acidic solution which is an electrolytic solution, it is possible to use, in addition to the above-described acids, electrolytic solutions disclosed in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably 0.1% to 2.5% by mass, and particularly preferably 0.2% to 2.0% by mass. In addition, the liquid temperature of the acidic solution is preferably 20° C. to 80° C. and more preferably 30° C. to 60° C.

An aqueous solution mainly including the above-described acid can be used by adding, to an aqueous solution of an acid having a concentration of 1 to 100 g/L, at least one of a nitric acid compound having nitrate ions such as aluminum nitrate, sodium nitrate, or ammonium nitrate, a hydrochloric acid compound having hydrochloric acid ions such as aluminum chloride, sodium chloride, or ammonium chloride, or a sulfuric acid compound having sulfuric acid ions such as aluminum sulfate, sodium sulfate, or ammonium sulfate in a range of 1 g/L to saturation.

In addition, in the aqueous solution mainly including the above-described acid, metals which are included in an aluminum alloy, such as iron, copper, manganese, nickel, titanium, magnesium, and silica, may be dissolved. A liquid obtained by adding aluminum chloride, aluminum nitrate, aluminum sulfate, or the like to an aqueous solution of an acid having a concentration of 0.1% to 2% by mass so that the concentration of aluminum ions falls in a range of 1 to 100 g/L is preferably used.

In the electrochemical dissolution treatment, a direct current is mainly used, but in a case where an alternating current is used, the alternating current power source wave is not particularly limited, and a sine wave, a rectangular wave, a trapezoidal wave, a triangular wave, and the like can be used. Among these, a rectangular wave or a trapezoidal wave is preferable, and a trapezoidal wave is particularly preferable.

Nitric Acid Electrolysis

In the present invention, it is possible to easily form through-holes having an average opening diameter of 0.1 µm or more and 100 µm or less by an electrochemical dissolution treatment in which an electrolytic solution mainly including nitric acid is used (hereinafter, also abbreviated as a "nitric acid dissolution treatment").

Here, it is preferable that the nitric acid dissolution treatment is an electrolytic treatment which is performed using a direct current under conditions of an average current density of 5 A/dm$^2$ or more and a quantity of electricity of 50 C/dm$^2$ or more, for the reason that dissolution points of the through-hole formation can be easily controlled. The average current density is preferably 100 A/dm$^2$ or less, and the quantity of electricity is preferably 10000 C/dm$^2$ or less.

In addition, the concentration and temperature of the electrolytic solution in the nitric acid electrolysis are not particularly limited, and it is possible to perform electrolysis using a nitric acid electrolytic solution having a high concentration, for example, a nitric acid concentration of 15% to 35% by mass at 30° C. to 60° C. or perform electrolysis using a nitric acid electrolytic solution having a nitric acid concentration of 0.7% to 2% by mass at a high temperature, for example, 80° C. or higher.

In addition, it is possible to perform electrolysis using an electrolytic solution obtained by mixing at least one of sulfuric acid, oxalic acid, or phosphoric acid having a concentration 0.1% to by mass with the above-described nitric acid electrolytic solution.

Hydrochloric Acid Electrolysis

In the present invention, it is also possible to easily form through-holes having an average opening diameter of 1 µm or more and 100 µm or less by an electrochemical dissolution treatment in which an electrolytic solution mainly including hydrochloric acid is used (hereinafter, also abbreviated as a "hydrochloric acid dissolution treatment").

Here, it is preferable that the hydrochloric acid dissolution treatment is an electrolytic treatment which is performed using a direct current tide conditions of an average current density of 5 A/dm$^2$ or more and a quantity of electricity of 50 C/dm$^2$ or more, for the reason that dissolution points of the through-hole formation can be easily controlled. The average current density is preferably 100 A/dm$^2$ or less, and the quantity of electricity is preferably 10000 C/dm$^2$ or less.

In addition, the concentration and temperature of the electrolytic solution in the hydrochloric acid electrolysis are not particularly limited, and it is possible to perform electrolysis using a hydrochloric acid electrolytic solution having a high concentration, for example, a hydrochloric acid concentration of 10% to 35% by mass at 30° C. to 60° C. or perform electrolysis using a hydrochloric acid electrolytic solution having a hydrochloric acid concentration of 0.7% to 2% by mass at high temperature, for example, 80° C. or higher.

In addition, it is possible to perform electrolysis using an electrolytic solution obtained by mixing at least one of sulfuric acid, oxalic acid, or phosphoric acid having a concentration of 0.1% to 50% by mass with the above-described hydrochloric acid electrolytic solution.

Film Removing Step

The film removing step is a step of performing a chemical dissolution treatment to remove the aluminum hydroxide film.

In the film removing step, the aluminum hydroxide film can be removed by, for example, performing an acid etching treatment or an alkali etching treatment described below.

Acid Etching Treatment

The above-mentioned dissolution treatment is a treatment of dissolving an aluminum hydroxide film using a solution that preferentially dissolves aluminum hydroxide rather than aluminum (hereinafter, referred to as an "aluminum hydroxide dissolution solution").

Here, for example, the aluminum hydroxide dissolution solution is preferably an aqueous solution containing at least one selected from the group consisting of nitric acid, hydrochloric acid, sulfuric acid, phosphoric acid, oxalic acid, chromium compounds, zirconium based compounds, titanium-based compounds, lithium salts, cerium salts, magnesium salts, sodium silicofluoride, zinc fluoride, manganese compounds, molybdenum compounds, magnesium compounds, barium compounds, and halogen single bodies.

Specific examples of the chromium compounds include chromium (III) oxide and anhydrous chromium (VI) acid.

Examples of the zirconium-based compounds include ammonium fluorozirconate, zirconium fluoride, and zirconium chloride.

Examples of the titanium based compounds include titanium oxide and titanium sulfide.

Examples of the lithium salts include lithium fluoride and lithium chloride.

Examples of the cerium salts include cerium fluoride and cerium chloride.

Examples of the magnesium salts include magnesium sulfide.

Examples of the manganese compounds include sodium permanganate and calcium permanganate.

Examples of the molybdenum compounds include sodium molybdate.

Examples of the magnesium compounds include magnesium fluoride pentahydrate.

Examples of the barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates thereof.

Among the above barium compounds barium oxide, barium acetate, and barium carbonate are preferable, and barium oxide is particularly preferable.

Examples of the halogen single bodies include chlorine, fluorine, and bromine.

In particular, the aluminum hydroxide dissolution solution is preferably an aqueous solution containing an acid, examples of the acid include nitric acid, hydrochloric acid, sulfuric acid, phosphoric acid, and oxalic acid, and the acid may be a mixture of two or more acids. In particular, it is preferable to use nitric acid as an acid.

The acid concentration is preferably 0.01 mol/L or more, more preferably 0.05 or more, and still more preferably 0.1 or more. Although the upper limit is not particularly limited, the upper limit is generally preferably 10 mol/L, or less and more preferably 5 mol/L or less.

The dissolution treatment is performed by bringing the aluminum substrate on which the aluminum hydroxide film is formed into contact with the above-described dissolution solution. The contact method is not particularly limited, and examples thereof include a dipping method and a spraying method. Among these, the spraying method is preferable.

The spraying method is a treatment of spraying a dissolution solution while transporting the aluminum substrate on which the aluminum hydroxide film is formed, and it is preferable to spray the dissolution solution from both sides. The spraying treatment time varies depending on the transportation speed, and is preferably 5 seconds or longer, more preferably 15 seconds or longer, and still more preferably 30 seconds or longer.

Alkali Etching Treatment

The alkali etching treatment is a treatment of dissolving the surface layer by bringing the aluminum hydroxide film into contact with an alkaline solution.

Examples of the alkalis that can be used in the alkaline solution include caustic alkalis and alkali metal salts. Specific examples of the caustic alkalis include sodium hydroxide (caustic soda) and caustic potash. In addition, examples of the alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of the caustic alkalis and solutions containing both the caustic alkali and the alkali metal aluminate are preferable from the viewpoint of the fast etching rates and the cheap prices. In particular, an aqueous solution of sodium hydroxide is preferable.

The concentration of the alkaline solution is preferably 0.1% to 50% by mass and more preferably 0.2% to 10% by mass. In a case where the alkaline solution has aluminum ions dissolved therein, the concentration of the aluminum ions is preferably 0.01% to 10% by mass and more preferably from 0.1% to 3% by mass. The temperature of the alkaline solution is preferably 10° C. to 90° C. The treatment time is preferably 1 to 120 seconds.

Examples of a method for bringing the aluminum hydroxide film into contact with the alkaline solution include a method in which the aluminum substrate on which the aluminum hydroxide film is formed is allowed to pass through a tank containing the alkaline solution, a method in which the aluminum substrate on which the aluminum hydroxide film is formed is dipped into a tank containing the alkaline solution, and a method in which the alkaline solution is sprayed onto the surface (aluminum hydroxide film) of the aluminum substrate on which the aluminum hydroxide film is formed.

Roughening Treatment Step

The roughening treatment step is a step of performing an electrochemical roughening treatment (hereinafter, also abbreviated as an "electrolytic roughening treatment") on the aluminum substrate from which the aluminum hydroxide film has been removed to roughen the front surface or the back surface of the aluminum substrate, and is used as needed.

By performing the electrolyte roughening treatment to roughen the surface of the aluminum foil, the adhesiveness with the layer containing the active material is improved, and the contact area is increased by increasing the surface area, so that the capacity retention rate of an electric storage device formed of the obtained aluminum foil increased.

As the electrolytic roughening treatment, it is possible to appropriately employ, for example, conditions or devices disclosed in paragraphs [0041] to [0050] of JP2012-216513A.

In the above-described manufacturing method, although the non-through-holes are also formed in a case where the through-holes are formed after the aluminum hydroxide film is formed, the non-through-holes can be densely formed by further performing the roughening treatment.

In addition, in the above embodiment, a configuration win which the toughening treatment is performed after the through-holes are formed is adopted, but the present invention is not limited to this, and a configuration in which the through-holes are formed after the roughening treatment may be adopted.

Nitric Acid Electrolysis

As the roughening treatment, an electrochemical roughening treatment (hereinafter, also abbreviated as "nitric acid electrolysis") using an electrolytic solution mainly including nitric acid can be adopted.

Here, the nitric acid electrolysis is preferably an electrolytic treatment which is performed using an alternating current under conditions of a peak current density of 30 A/dm$^2$ or more, an average current density of 13 A/dm$^2$ or more, and a quantity of electricity of 150 C/dm$^2$ or more. The peak current density is preferably 100 A/dm$^2$ or less, the average current density is preferably 40 A/dm$^2$ or less, and the quantity of electricity is preferably 400 C/dm$^2$ or less.

In addition, the concentration and temperature of the electrolytic solution in the nitric acid electrolysis are not particularly limited, and it is possible to perform electrolysis using a nitric acid electrolytic solution having a high concentration, for example, a nitric acid concentration of 15% to 35% by mass at 30° C. to 60° C. or perform electrolysis using a nitric acid electrolytic solution having a nitric acid concentration of 0.7% to 2% by mass at a high temperature, for example, 80° C. or higher.

Hydrochloric Acid Electrolysis

As the roughening treatment, an electrochemical roughening treatment (hereinafter, also abbreviated as "hydrochloric acid electrolysis") using an electrolytic solution mainly including hydrochloric acid can be adopted.

Here, in the hydrochloric acid electrolysis, it is preferable to perform an electrolytic treatment using an alternating current under conditions of a peak current density of 30 A/dm$^2$ or more, an average current density of 13 A/dm$^2$ or more, and as quantity of electricity of 10 C/dm$^2$ or more. The peak current density is preferably 100 A/dm$^2$ or less, the average current density is preferably 40 A/dm$^2$ or less, and the quantity of electricity is preferably 400 C/dm$^2$ or less.

Water-Washing Step

As described above, in the present invention, it is preferable to perform water-washing after the completion of each of the above-described treatment steps. Pure water, well water, tap water, or the like can be used for water-washing. In order to prevent the treatment liquids from being carried to the subsequent steps, a nipping device may be used.

Drying Step

As described above, it is preferable to provide a drying step of performing a drying treatment after the water-washing step after each step.

The drying method is not particularly limited, and a well drying method such as a method of blowing off moisture with an air knife or the like and a method by heating can be appropriately used. In addition, a plurality of drying methods may be performed.

Collector

As described above, the aluminum foil of the embodiment of the present invention can be used as a collector for an electric storage device thereinafter, referred to as a "collector").

Since the aluminum foil has a plurality of through-holes in the thickness direction in the collector, for example, in a case of using the collector for a lithium ion capacitor, pre-doping of lithium can be performed in a short period of time, and lithium can be more uniformly dispersed. In addition, the adhesiveness with the active material layer and the activated carbon is improved, and an electric storage device having excellent productivity such as cycle characteristics, output characteristics, and coating suitability can be produced.

Active Material Layer

The active material layer is not particularly limited, and a well-known active material layer used in an electric storage device of the related art can be used.

Specifically, regarding conductive materials, binders, solvents, and the like that may be contained in the active material and the active material layer in a case where the aluminum foil is used as a collector for a positive electrode, it is possible to appropriately employ materials disclosed in paragraphs [0077] to [0088] of JP2012-216513A, the contents of which are incorporated into the present specification by reference.

In addition, regarding the active materials in a case where the aluminum foil is used as a collector for a negative electrode, it is possible to appropriately employ materials disclosed in paragraph [0089] of JP2012-216513A, the contents of which are incorporated into the present specification by reference.

Electric Storage Device

The electrode in which the aluminum foil of the embodiment of the present invention is used as a collector can be used as a positive electrode or a negative electrode in an electric storage device such as a lithium ion battery or a lithium ion capacitor.

Here, regarding the specific configuration or applications of the electric storage device (particularly, a secondary battery), it is possible to appropriately employ materials or applications disclosed in paragraphs [0090] to [0123] of JP2012-216513A, the contents of which are incorporated into the present specification by reference.

Positive Electrode

The positive electrode in which the aluminum foil of the embodiment of the present invention is used as a collector is a positive electrode having a positive electrode collector in which the aluminum foil is used for a positive electrode and a layer including a positive electrode active material that is formed on the surface of the positive electrode collector (positive electrode active material layer).

Here, regarding the positive electrode active material, a conductive material, a hinder, a solvent, and the like that may be contained in the positive electrode active material layer, it is possible to appropriately employ materials disclosed in paragraphs [0077] to [0088] of JP2012-216513A, the contents of which are incorporated into the present specification by reference.

Negative Electrode

The negative electrode in which the aluminum foil of the embodiment of the present invention is used as a collector is a negative electrode having a negative electrode current collector in which the aluminum foil is used for a negative electrode and a layer including a negative electrode active material that is formed on the surface of the negative electrode collector.

Here, regarding the negative electrode active material, it is possible to appropriately employ materials disclosed in paragraph [0089] of JP2012-216513A, the contents of which are incorporated into the present specification by reference.

Other Applications

The aluminum foil of the embodiment of the present invention can also be used as a collector for an electrolytic capacitor.

EXAMPLES

Hereinafter, the present invention will be described in more detail based on examples. The materials, amounts used, ratios, treatment details, treatment procedures, and the like shown in the following examples can be changed as appropriate without departing from the spirit of the present invention. Therefore, the scope of the present invention should not be construed as being limited by the following examples.

Example 1

An aluminum substrate roll (1085 material) having a width of 350 mm, a thickness of 20 μm, and a length of 1000 m was prepared, and while the aluminum substrate was pulled out from the aluminum substrate roll and transported in the longitudinal direction, the following steps were continuously carried out to produce the aluminum foil of the embodiment of the present invention, and the aluminum foil was wound. The winding shaft was made of a resin with an inner diameter of 3 inches.

Oxide Film Forming Step

An electrolytic treatment was performed under a condition of a sum of quantities of electricity of 1000 C/dm$^2$ using an electrolytic solution (nitric acid concentration: 1%, sulfuric acid concentration: 0.2%, aluminum concentration: 0.5%) which was held at 50° C. and the above-described aluminum substrate as a cathode, thereby forming an aluminum hydroxide film the aluminum substrate. The electrolytric treatment was performed using a direct current power supply. The current density was set to 50 A/dm$^2$.

After the formation of the aluminum hydroxide film, water-washing by spraying was performed.

Through-Hole Forming Step

Next, an electrolytic treatment was performed under a condition of a sum of quantities of electricity of 500 C/dm$^2$ using an electrolytic solution (nitric acid concentration: 1%, sulfuric acid concentration: 0.2%, aluminum concentration: 0.5%) which was held at 50° C. and the aluminum substrate as an anode, thereby forming through-holes in the aluminum substrate and the aluminum hydroxide film. The electrolytic treatment was carried out using a direct current power supply. The current density was set to 25 A/dm$^2$.

In this case, as shown in FIG. 16, the current shielding plates were disposed at both end portions in the width direction between the aluminum substrate and the electrode.

A carbon electrode was used as the electrode. The distance between the aluminum substrate and the electrode was set to 20 mm.

As the current shielding plate, a plate having a thickness of 20 mm and a material of vinyl chloride was used. The current shielding plates were disposed on both end sides of the aluminum substrate in the width direction so as to cover a region of the width of 20 mm from the end side. In addition, the corner portion on the aluminum foil side of the end portion on the center side in the width direction of the current shielding plate was set to R10 mm.

After the formation of the through-holes, water-washing by spraying was performed, followed by a film removing step.

Film Removing Step

Next, an aqueous solution (liquid temperature: 35° C.) having a sodium hydroxide concentration of 5% by mass and an aluminum ion concentration of 0.5% by mass was sprayed onto the aluminum substrate after the electrolytic dissolution treatment from both sides for 30 seconds, and then an aqueous solution (liquid temperature: 50° C.) having a nitric acid concentration of 1% and an aluminum ion concentration of 0.5% by mass was sprayed (hereunto from both sides for 30 seconds, thereby dissolving and removing the aluminum hydroxide film.

Thereafter, water-washing by spraying was performed to produce the aluminum foil having through-holes.

The aluminum foil was produced continuously for 300 m or more, and the presence or absence of distortion was observed on the winding shaft at a timing of being wound up to 50 m, a timing of being wound up to 100 m, and a timing of being wound up to 300 m. As a result, no distortion was observed in any of them.

Immediately after the start of the production, samples were collected, and then the above observation was performed by rewinding. In addition, at five locations at intervals of 50 mm in the longitudinal direction of the collected sample, a perforated portion, a hole density decreasing portion, and a non-perforated portion were determined as follows.

First, the aluminum foil was placed on a bottom light emitting light source, and a region of 3 mm×3 mm was observed at intervals of 1 mm the width direction from the end portion in the width direction, and a region where the transmitted light was not seen was determined as a non-perforated portion.

Next, an aluminum foil was placed on a surface light emitting plate such as Schaukasten, a part where the transmitted light was visually reduced was defined as a temporary hole density decreasing portion, and in the width direction, a region on the perforated portion side of 10 mm or more from a boundary between the temporary hole density decreasing portion and the perforated portion was defined. The average opening ratio in the perforated portion was obtained by the method described above. As a result, the average opening ratio was 5%.

Next, a visual field of 1 mm (width direction)×0.7 mm (length direction) was observed at a magnification of 100 by changing the position in the width direction in a unit of 1 mm centering on the temporary boundary between the perforated portion and the hole density decreasing portion. In a case where a value of the opening ratio of the perforated portion was X, a region where an opening ratio is initially 0.7 X or less in a case where a region having the opening ratio of 0.7 X or less continued in two or more consecutive locations was defined as the boundary between the perforated portion and the hole density decreasing portion.

As a result, the perforated portion, the hole density decreasing portion, and the non-perforated portion were determined. In the hole density decreasing portion, it was confirmed that the opening ratio due to the through-holes gradually decreased from 3.5% to the vicinity of 0% from the perforated portion side to the non-perforated portion side.

The width of the hole density decreasing portion varied in a range between 8 mm and 13 mm depending on the position in the longitudinal direction. In addition, the perforated portion substantially coincided with a region where the current shielding plate was not disposed in the through-hole forming step, and the width thereof was 310 mm.

The average opening diameter and number density of the through-holes, the presence or absence and area occupation ratio of the non-through-holes, and specific surface area in the perforated portion were measured by the above-described method. The average opening diameter was 20 μm. The number density was 140 pieces/mm$^2$. It was confirmed that the non-through-hole is provided. The area occupation ratio of the non-through-holes was 2%. The specific surface area was 5%.

The number density of the through-holes, the presence or absence and area occupation ratio of the non-through-holes, and specific surface area in the hole density decreasing portion were measured by the above-described method. The number density gradually decreased from 140 pieces/mm$^2$ to the vicinity of 0 pieces/mm$^2$ from the perforated portion side to the non-perforated portion side. It was confirmed that the non-through-hole is provided. The area occupation ratio of the non-through-holes was 1%. The specific surface area was 2.5%.

Example 2

An aluminum foil was produced in the same manner as in Example 1 except that the total amount of electricity in the through-hole forming step was set to 350 Cdm$^2$.

Example 3

An aluminum foil was produced in the same manner as in Example 1 except that the total amount of electricity in the through-hole forming step was set to 1000 Cdm$^2$.

Example 4

An aluminum foil was produced in the same manner as in Example 1 except that the shape of the current shielding plate was such that the corner portion on the aluminum foil side of the end portion on the center side in the width direction was C-chamfered by 5 mm as in the example shown in FIG. 17 in the through-hole forming step.

Example 5

An aluminum foil was produced in the same manner as in Example 1 except that the corner portion on the aluminum foil side of the end portion on the center side in the width direction of the current shielding plate was R-processed by R5 mm in the through-hole forming step.

Example 6

An aluminum foil was produced in the same manner as in Example 1 except that the corner portion on the aluminum foil side of the end portion on the center side in the width direction of the current shielding plate was chamfered by C1 mm in the through-hole forming step.

Comparative Example 1

An aluminum foil was produced in the same manner as in Example 1 except that the corner portion on the aluminum foil side of the end portion on the center side in the width direction of the current shielding plate was not R-processed in the through-hole forming step.

Evaluation

Presence or Absence of Strain during Winding

For the aluminum foil produced in each example and comparative example, in the same manner as in Example 1, the presence or absence of distortion was observed on the winding shaft at a timing of being wound up to 50 m, a timing of being wound up to 100 m, and a timing of being wound up to 300 m.

Adhesiveness of Activated Carbon

The aluminum foil produced in each of Examples 1 to 3 was coated with activated carbon so as to have a thickness of 50 μm on both sides, and dried. In this case, the coating width was set to include a part of the perforated portion and a part of the hole density decreasing portion, and the activated carbon was not applied to a part of the hole density decreasing portion and the non-perforated portion. After the coating and drying, roll-type pressing was performed, and further, a work of cutting the aluminum foil into a predetermined length was performed. After pressing and cutting, the presence or absence of peeling of the layer to which the activated carbon is applied was examined.

The results are shown in Tables 1 and 2.

TABLE 1

| | Perforated portion | | | Hole density decreasing portion | | | Evaluation | | |
| | Average opening ratio % | Average opening diameter μm | Number density Pieces/mm$^2$ | Presence or absence | Opening ratio % | Number density Pieces/mm$^2$ | Width mm | Presence or absence of strain during winding 50 m | 100 m | 300 m |
|---|---|---|---|---|---|---|---|---|---|---|
| Example 1 | 5 | 20 | 140 | Present | 3.5 to 0 | 140 to 0 | 8 to 13 | Absent | Absent | Absent |
| Example 2 | 3 | 18 | 90 | Present | 2.1 to 0 | 80 to 0 | 4 to 8 | Absent | Absent | Absent |
| Example 3 | 10 | 25 | 200 | Present | 7 to 6 | 140 to 0 | 10 to 15 | Absent | Absent | Absent |

TABLE 1-continued

| | Perforated portion | | | Hole density decreasing portion | | | Evaluation | | |
| | Average | | | | | | Presence or absence of strain during winding | | |
| | Average opening ratio % | Average opening diameter μm | Number density Pieces/mm² | Presence or absence | Opening ratio % | Number density Pieces/mm² | Width mm | 50 m | 100 m | 300 m |
|---|---|---|---|---|---|---|---|---|---|---|
| Example 4 | 5 | 20 | 140 | Present | 3.5 to 0 | 140 to 0 | 6 to 9 | Absent | Absent | Absent |
| Example 5 | 5 | 20 | 140 | Present | 3.5 to 0 | 140 to 0 | 4 to 6 | Absent | Absent | Absent |
| Example 6 | 5 | 20 | 140 | Present | 3.5 to 0 | 140 to 0 | 1 to 2 | Absent | Present | Present |
| Comparative Example 1 | 5 | 20 | 140 | Absent | — | — | — | Present Present | Present Present | Present Present |

| | Area occupation ratio of non-through-hole | | Specific surface area | | Evaluation | |
| | | | | | Presence or absence of peeling of activated carbon | |
| | Perforated portion | Hole density decreasing portion | Perforated portion | Hole density decreasing portion | After pressing | After cutting |
| | % | % | % | % | | |
|---|---|---|---|---|---|---|
| Example 1 | 2.0 | 1.0 | 5.0 | 2.5 | Absent | Absent |
| Example 2 | 4.0 | 2.0 | 8.0 | 6.0 | Absent | Absent |
| Example 3 | 20.0 | 15.0 | 10.0 | 7.0 | Absent | Absent |

From Table 1, it can be seen that in the comparative example having no hole density decreasing portion, strain occurs in a case where the aluminum is wound in a long form during winding. On the other hand, it can be seen that since in the examples of the present invention, a hole density decreasing portion is provided, the occurrence of strain during winding can be suppressed even though the aluminum foil is wound for 300 m.

In addition, from the comparison of Examples 1 and 4 to 6, it can be seen that the width of the hole density decreasing portion is preferably 3 mm or more.

From Table 2, it can be seen that in Examples 1, 2, and 3, as the through hole forming current increases, the number of the through-holes increases, the number of the non-through-holes also increases, and the area occupation ratio of the non-through-holes increases in both the perforated portion and the hole density decreasing portion. It can be seen that the value of the specific surface area also increases accordingly.

In addition, regarding the adhesiveness of the activated carbon, it can be seen that in Examples 1, 2 and 3, no peeling occurs either after pressing or after cutting. It is considered that these results show that the aluminum foil has the non-through-holes in the perforated portion and the hole density decreasing portion, and the specific surface area is equal to or more than a predetermined value, so that the aluminum foil has excellent adhesiveness in both the perforated portion and the hole density decreasing portion.

From the above, the effect of the present invention is obvious.

EXPLANATION OF REFERENCES

1: aluminum substrate
2: aluminum hydroxide film
3: aluminum substrate having through-hole
3a: perforated portion
3b: non-perforated portion
3c: boundary portion
4: aluminum hydroxide film having through-hole
5: through-hole
10: aluminum foil
20: electrode
22a, 22b: current shielding plate
$W_1$: width of boundary portion
$W_2$: width of non-perforated portion

What is claimed is:

1. A long aluminum foil comprising:
in a width direction orthogonal to a longitudinal direction,
a perforated portion;
two non-perforated portions, each provided separately at both ends of the long aluminum foil in the width direction; and
a hole density decreasing portion between the perforated portion and each of the two non-perforated portions,
wherein the perforated portion has a plurality of through-holes penetrating therethrough in a thickness direction,
the two non-perforated portions do not have a through-hole,
the hole density decreasing portions have a plurality of through-holes penetrating therethrough in the thickness direction and a plurality of non-through-holes that do not penetrate, and
in the hole density decreasing portions, an opening ratio due to the through-holes gradually decreases from a perforated portion side to a non-perforated portion side.

2. The long aluminum foil according to claim 1, wherein the perforated portion further has a plurality of non-through-holes.

3. The long aluminum foil according to claim 2, wherein an area occupation ratio of the non-through-holes in the perforated portion is 1% or more and 20% or less.

4. The long aluminum foil according to claim 1, wherein a specific surface area $\Delta S_1$ on a surface of the perforated portion is 5% or more.

5. The long aluminum foil according to claim 1,
wherein a specific surface area $\Delta S_2$ on a surface of the hole density decreasing portions is 2.5% or more.

6. The long aluminum foil according to claim 1,
wherein an area occupation ratio of the non-through-holes in the hole density decreasing portions is 1% or more and 15% or less.

7. The long aluminum foil according to claim 1,
wherein in the width direction, a number density of the through-holes in each of the hole density decreasing portions gradually decreases from the perforated portion side to the non-perforated portion side, and
an average number density of the through-holes in the hole density decreasing portions is 10% or more and 90% or less of an average number density of the through-holes in the perforated portion.

8. The long aluminum foil according to claim 1,
wherein an average opening diameter of the hole density decreasing portions is 0.1 µm to 100 µm.

9. The long aluminum foil according to claim 1,
wherein a width of the hole density decreasing portions in the width direction is 3 mm or more.

10. The long aluminum foil according to claim 1,
wherein the long aluminum foil is wound in a roll shape.

11. The long aluminum foil according to claim 2,
wherein a specific surface area $\Delta S_1$ on a surface of the perforated portion is 5% or more.

12. The long aluminum foil according to claim 2, wherein a specific surface area $\Delta S_2$ on a surface of the hole density decreasing portions is 2.5% or more.

13. The long aluminum foil according to claim 2,
wherein an area occupation ratio of the non-through-holes in the hole density decreasing portions is 1% or more and 15% or less.

14. The long aluminum foil according to claim 2,
wherein in the width direction, a number density of the through-holes in each of the hole density decreasing portions gradually decreases from the perforated portion side to the non-perforated portion side, and
an average number density of the through-holes in the hole density decreasing portions is 10% or more and 90% or less of an average number density of the through-holes in the perforated portion.

15. The long aluminum foil according to claim 2,
wherein an average opening diameter of the through-holes in the hole density decreasing portions is 0.1 µm to 100 µm.

16. The long aluminum foil according to claim 2,
wherein a width of the hole density decreasing portions in the width direction is 3 mm or more.

17. The long aluminum foil according to claim 1,
wherein the perforated portion further has a plurality of non-through-holes,
an area occupation ratio of the non-through-holes in the perforated portion is 1% or more and 20% or less, and
an average opening ratio of the through holes in the perforated portion is 0.15% to 30%.

* * * * *